United States Patent [19]
Flander

[11] 3,708,883
[45] Jan. 9, 1973

[54] DENTAL IMPLANT AND METHOD FOR USING THE SAME

[76] Inventor: Stanley Flander, 77-10 34th Avenue, Jackson Heights, N.Y. 11372

[22] Filed: Jan. 4, 1971

[21] Appl. No.: 103,605

[52] U.S. Cl. .................................................32/10 A
[51] Int. Cl...............................................A61c 13/00
[58] Field of Search.......................................32/10 A

[56] References Cited

UNITED STATES PATENTS 2,721,387  10/1955  Ashuckian............................32/10 A

*Primary Examiner*—Robert Peshock
*Attorney*—Steinberg & Blake

[57] ABSTRACT

A dental implant which has an elongated tubular body provided with an outer anchoring portion and an inner portion adapted to be situated within a bone bore. The body has a pair of extensions projecting from its inner portion inwardly along the interior of the bone bore and provided with exterior projections, these extensions being spreadable for pressing the projections into the bone at the bore thereof. An elongated spreader screw extends through the tubular body and has a wedge-shaped spreader end situated between the extensions. A nut mounted on the outer end of the tubular body is threaded onto the screw to pull the latter outwardly so that the spreader end portion will spread the extensions apart from each other to press the exterior projections into the bone. The part of the screw and an artificial tooth is anchored to the nut as well as the outer portion of the tubular body which projects beyond the gum line.

8 Claims, 4 Drawing Figures

PATENTED JAN 9 1973  3,708,883
FIG.1
FIG.2
FIG.3
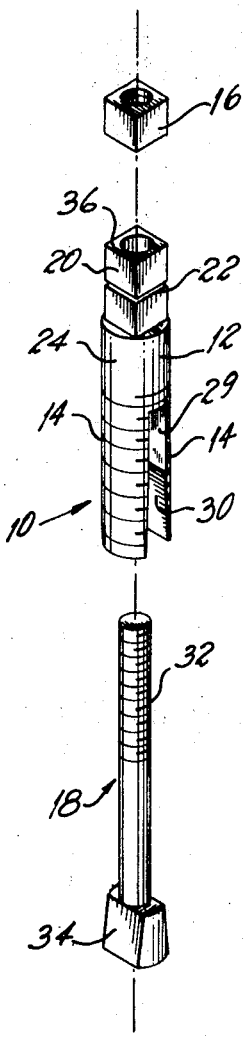
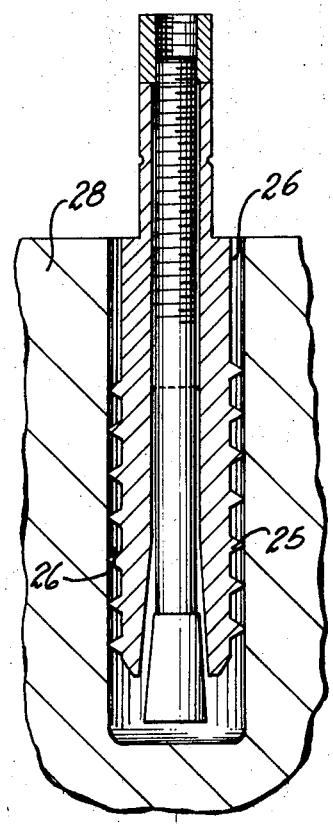
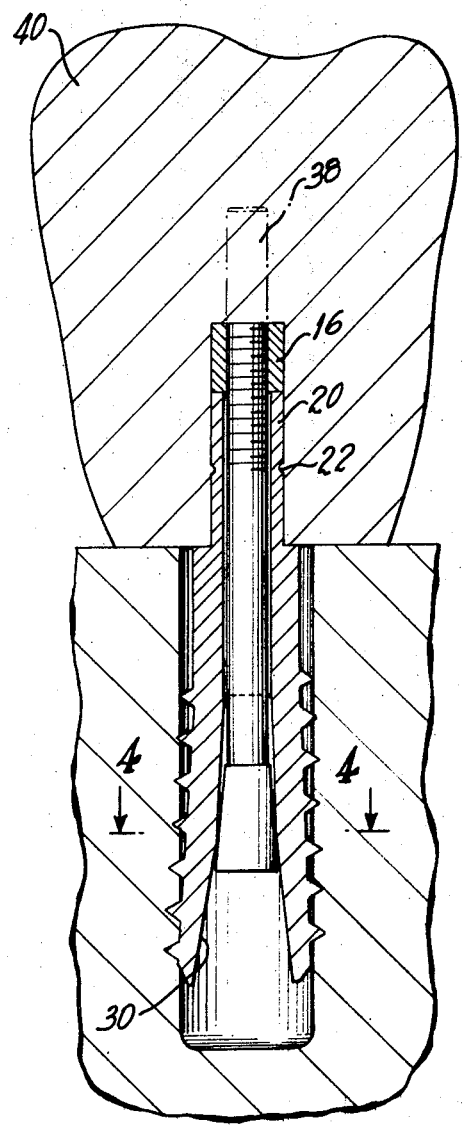
FIG.4
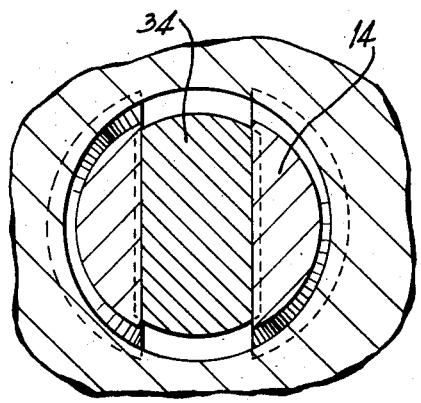
INVENTOR.
STANLEY FLANDER
BY
Steinberg and Blake
ATTORNEY 3,708,883

DENTAL IMPLANT AND METHOD FOR USING THE SAME

BACKGROUND OF THE INVENTION

The present invention relates to dental implants as well as to methods for using the same.

As is well known, it is possible to insert into the bone a dental implant which can be secured in the bone and which at the same time can serve to anchor an artificial tooth in the bone.

Although such devices and methods are in general known, the conventional structures and methods suffer from serious drawbacks. In the first place they are extremely complex and difficult to manipulate. With conventional arrangements it is necessary to exert extremely great care in order to avoid damage to the body tissues and passages. Also, it is essential with the known structures to form relatively large openings in the bone, requiring undesirable surgical procedures to be performed. In addition, the securing of the artificial tooth is now always reliable and the possibility of growth of the bone tissue in a manner which will enhance the security is now always readily possible.

SUMMARY OF THE INVENTION

It is accordingly a primary object of the present invention to provide a dental implant which will avoid the above drawbacks and which can be manipulated in such a way as to provide a far better method of use than has heretofore been achieved.

Thus, it is an object of the present invention to provide a dental implant which is composed of a relatively small number of extremely simple elements which can be manufactured and sold at relatively low cost.

Also, it is an object of the present invention to provide a dental implant structure which can be very easily introduced into the bone with a minimum of surgical procedures while at the same time achieving a great security in the maintaining of the implant within the bone and also avoiding the possibility of undesirable injury to the patient.

Furthermore, it is an object of the present invention to provide a construction of this type which will greatly enhance not only the security of anchoring but also the possibility of growth of bone tissue into and around the implant for increasing the security of the connection.

It is also an object of the present invention to provide a method according to which it becomes possible to quickly and efficiently carry out the required operations, reducing the discomfort to a patient to the absolute minimum and at the same time achieving the highest degree of security in the connection of an artificial tooth to the bone.

According to the invention the implant includes an elongated tubular body having an outer anchoring portion and an inner portion to be situated within a bone bore. This inner portion of the tubular body fixedly carries a pair of extensions also situated within the bone bore and having exterior projections. A spreader means extends along the interior of the tubular body and has a spreader end portion to be situated between the extensions for spreading the latter apart from each other, thus pressing the projections into the bone, while the spreader means is pulled outwardly beyond the outer anchoring portion of the tubular body. A pulling means situated at the outer anchoring portion of the tubular body coacts with the spreader means to pull the latter for spreading the extensions apart from each other. A part of the spreader means which finally projects beyond the pulling means can be removed and the pulling means together with the outer anchoring portion serve for anchoring the artificial tooth to the bone.

BRIEF DESCRIPTION OF DRAWINGS

The invention is illustrated by way of example in the accompanying drawings which form part of this application and which:

FIG. 1 is an exploded perspective view of a dental implant according to the invention;

FIG. 2 is a sectional elevation showing the implant of the invention within a bone bore;

FIG. 3 illustrates the structure of FIG. 2 after the spreader means has been pulled by a pulling means and after an artificial tooth shown in FIG. 3 has been fixed to the bone by the implant of the invention, FIG. 3 showing in phantom lines part of the pulling means which is removed; and FIG. 4 is a sectional plan view taken along line 4—4 of FIG. 3 in the direction of the arrows and illustrating further details of the invention.

DESCRIPTION OF PREFERRED EMBODIMENTS

Referring now to the drawings, the dental implant 10 of the present invention requires only three components, as is apparent from FIG. 1. These components include an elongated tubular body 12 having a pair of extensions 14. Also, the components include a nut 16 and a spreader means 18.

The tubular body 12 has an outer anchoring portion 20 which at its exterior surface is of a non-circular cross section. Thus in the illustrated example the exterior surface of the outer anchoring portion 20 of the tubular body 12 is of a square cross section. Intermediate its ends the outer anchoring portion 22 is formed with an exterior groove 22 for enhancing the anchoring action, as will be apparent from the description which follows.

The elongated tubular body 12 has an inner elongated portion 24 which is of a circular cross section and which is of a cross sectional area greater than that of the exterior anchoring portion 20. This portion 24 is adapted to be situated within a bone bore 26 of the bone 28 of the patient, as schematically represented in FIG. 2.

Integrally formed with the inner portion 24 of the body 12 are the pair of extensions 14 which are also adapted to be situated within the bone bore 26. These extensions 14 are respectively provided at their exteriors with projections 25 adapted to be pressed into the bone 28 at the bore 26 thereof. It will be noted that the extensions 14 have inner surfaces 29 which are inclined with respect to each other at the elongated portions 30, these inclined inner surface portions 30 diverging away from each other in the direction extending away from the inner portion 24 of the tubular body 12.

In order to spread the extensions 14 apart from each other, an elongated spreading means 18 is provided. This spreading means 18 includes the elongated threaded shank 32. The spreader means 18 terminates in a spreader end portion 34 which is of a wedge-shaped configuration having opposed inclined surfaces substantially matching the inclination of the surfaces 30.

The elongated spreader means 18 is adapted to extend through the interior axial bore of the tubular body 12 with the spreader end portion 34 situated between the extensions 14 and at least initially between the inclined surfaces 30 in the manner apparent from FIGS. 2-4.

The pulling means 16 is in the form of a nut which is threaded onto the threaded shank 32 of the spreader means 18. This nut has an exterior surface which is of the same cross section as that of the outer anchoring portion 20. The nut 16 engages an exterior end face 36 of the body 12 and when the nut 16 is turned by any suitable wrench it will pull the spreader means 18 beyond the nut and outwardly beyond the exterior portion 20 from the position shown in FIG. 2 into a position such as that shown in FIG. 3. The result is that the shank 32 will have an elongated portion 38 which initially projects beyond the nut 16, as shown in phantom lines in FIG. 3.

The projections 25 are actually parts of threads formed at the exterior of the extensions 14 and extending along at least part of the exterior of the inner portion 24 of the tubular body 12. The entire body 12 and its extensions 14 are integrally formed of a material such as titanium which will not react with the body tissues. Also, the spreader means 18 and the pulling means 16 are made of titanium. The bone 28 is first formed with the bore 26 which has a diameter somewhat less than the exterior diameter of the threads or projections 25. After the simple bore 26 is initially formed, as schematically represented in FIG. 2, the implant 10, having the assembled condition shown in FIG. 2 is simply threaded into the bore 26 with the projections 25 having a frictional engagement with the inner surface of the bore 26.

With the parts in this position the operator will with a suitable wrench turn the nut 16 so as to pull the spreader means 18 in an upward direction as viewed in FIG. 2, thus causing the spreader end 34 to spread the extensions 14 apart from each other, bringing about the pressing of the projections 25 into the bone tissue.

The nut 16 is preferably turned not only until the desired effective anchoring is achieved, as shown in FIG. 3, but also until the angular position of the nut 16 brings about alignment of the nut 16 with the exterior surfaces of the outer anchoring portion 20.

When the parts have the position shown in FIG. 3, the extension 38 is simply cut off with any suitable tool, and then the artificial tooth 40 is mounted on the anchoring portion 22 and the nut 16 which forms an extension thereof. This artificial tooth 40 will have an inner bore for receiving the anchoring portion 20 and nut 16, and a suitable cement will be applied at the exterior of the anchoring portion 20 and nut 16 as well as in the interior of the bore of the artificial tooth 40, so that through this cement the artificial tooth will be reliably anchored on the dental implant of the invention. The presence of the groove 22 will enhance the security of the anchoring connection inasmuch as part of the cement will enter into this groove 22, and of course the same is true of part of the cement at the junction between the nut 16 and the end face 36.

Thus, through the above method and exceedingly simple structure of the invention it becomes possible to effectively anchor an artificial tooth. The implant of the invention requires only the formation of a simple bore 26 in the bone 28. Only three basic components are required so that the structure is exceedingly inexpensive and at the same time it is highly effective and can easily be manipulated so as to bring about the desired results.

What is claimed is:

1. A dental implant comprising an elongated tubular body having an elongated outer portion to be exposed beyond a bone bore and an elongated inner portion to be situated within a bone bore, said outer portion of said body being of a lesser cross sectional area and centrally situated with respect to said inner portion thereof and joined thereto by a shoulder of said tubular body, said body including a pair of spreadable extensions fixed to and extending beyond said inner portion of said body and respectively situated on opposite sides of an elongated central axis of said tubular body, said extensions having exterior projections extending substantially radially with respect to said axis and respectively having inner surfaces extending longitudinally with respect to said axis and directed toward each other, elongated one-piece spreader means situated within said elongated tubular body and consisting of a shank terminating at its bottom in a wedge-shaped spreader end portion integral with said shank and situated between said extensions for spreading the latter apart from each other to press said exterior projections into the bone at the bore thereof during movement of said spreader means through said tubular body and outwardly beyond said outer portion thereof while leaving beneath said spreader end portion a free, unobstructed space between said extensions into which bone tissue can grow, the size of the latter space along said axis being determined by the extent to which said shank of said spreader means is drawn out through said outer portion of said tubular body, and pulling means engaging said body at said outer portion thereof and coacting with said shank of said spreader means for pulling the latter through said tubular body outwardly beyond said outer portion thereof, so that after said spreader means has been pulled to a given extent outwardly beyond said body a portion of said shank of said spreader means extending beyond said pulling means can be removed, said pulling means maintaining said spreader means at the location with respect to said tubular body to which it has been pulled for spreading said extensions apart from each other and said pulling means together with said outer portion of said tubular body forming an anchoring means for anchoring an artificial tooth on said body at the bone, said outer portion of said tubular body terminating in an outer end face and said pulling means engaging said outer end face and forming an extension of said outer portion of said tubular body, said elongated spreader means having a threaded shank and said pulling means being in the form of a nut threaded onto said shank for pulling said spreader means in response to turning of said nut, said outer portion of said tubular body having an exterior surface of non-circular cross section and said nut having an exterior surface of a non-circular cross section matching that of said outer portion of said tubular body so that said nut can be turned to a position where it will form an extension of said outer portion which is of the same cross section as the latter, said inner surfaces of said extensions being inclined with respect to each other and said spreader end portion having opposed inclined surfaces of the same general inclination as said inner surfaces of said extensions.

2. The combination of claim 1 and wherein said projections are in the form of threads at the exterior of said extensions.

3. The combination of claim 1 and wherein said projections extend beyond said extensions to the exterior of said inner portion of said tubular body.

4. The combination of claim 3 and wherein said projections are threads and said extensions are integral with said tubular body.

5. The combination of claim 1 and wherein said exterior surface of said outer portion of said tubular body is formed with at least one exterior groove for contributing to the security with which an artificial tooth is anchored on said tubular body.

6. The combination of claim 1 and wherein said spreader end portion of said spreading means has a width less than that of said extensions and is situated centrally with respect thereto so that said extensions project beyond said spreader end portion of said spreading means.

7. A method of securing an implant in a bone bore comprising the steps of first drilling in bone a bore of a diameter slightly less than that of the implant, said implant comprising an elongated tubular body having an elongated outer portion to be exposed beyond the bone bore and an elongated inner portion to be situated within the bone bore, said outer portion of said body being of a lesser cross sectional area and being centrally situated with respect to said inner portion thereof and being joined thereto by a shoulder of said tubular body, introducing the implant into the bore at said inner portion of said tubular body until said shoulder reaches said bore so that said outer portion of said tubular body is exposed beyond said bore, the implant having spreadable portions situated within the bore and said outer portion of said tubular body forming an anchoring portion situated beyond the bore, said implant having an axial bore through which a screw with a spreader end extends, said outer portion of said tubular body having a non-circular cross section, mounting a nut of the same cross section as said outer portion of said tubular body on the screw in a position forming an extension of the outer portion of said tubular body so that by turning the nut the screw can be pulled outwardly with part of the threaded shank extending beyond the nut while the spreadable portions are spread within the bore for securing the implant in the bone bore, terminating the turning of the nut when it is in a position of angular alignment with said outer portion of said tubular body, then removing that portion of the threaded shank which extends beyond the nut, and then anchoring an artificial tooth to the nut and the outer portion of the tubular body extending outwardly beyond the bore.

8. A method as recited in claim 7 and wherein the implant is threaded into the bone bore.

* * * * *